US009382459B2

(12) United States Patent
Ogawa et al.

(10) Patent No.: US 9,382,459 B2
(45) Date of Patent: *Jul. 5, 2016

(54) SOLVENTLESS ONE LIQUID TYPE CYANATE ESTER-EPDXY COMPOSITE RESIN COMPOSITION

(75) Inventors: Ryo Ogawa, Kuki (JP); Yoko Masamune, Kuki (JP)

(73) Assignee: ADEKA CORPORATION, Arakawa-Ku, Tokyo (JP)

( * ) Notice: Subject to any disclaimer, the term of this patent is extended or adjusted under 35 U.S.C. 154(b) by 342 days.

This patent is subject to a terminal disclaimer.

(21) Appl. No.: 13/578,064

(22) PCT Filed: Feb. 10, 2011

(86) PCT No.: PCT/JP2011/000753
§ 371 (c)(1),
(2), (4) Date: Aug. 9, 2012

(87) PCT Pub. No.: WO2011/099292
PCT Pub. Date: Aug. 18, 2011

(65) Prior Publication Data
US 2012/0309923 A1    Dec. 6, 2012

(30) Foreign Application Priority Data
Feb. 12, 2010 (JP) ................................. 2010-028945

(51) Int. Cl.
*C08L 63/00*   (2006.01)
*C08G 73/02*   (2006.01)
(Continued)

(52) U.S. Cl.
CPC ............. *C09J 163/00* (2013.01); *C08G 59/184* (2013.01); *C08G 59/28* (2013.01);
(Continued)

(58) Field of Classification Search
CPC ....................................... C08G 59/28
USPC ............................................. 528/99
See application file for complete search history.

(56) References Cited

U.S. PATENT DOCUMENTS 4,360,649 A * 11/1982 Kamio ............... C08G 59/1477
  525/484
5,186,880 A *  2/1993 Gaku et al. ..................... 264/236
(Continued)

FOREIGN PATENT DOCUMENTS

JP        6-256744 A     9/1994
JP        7-304968 A    11/1995
(Continued)

OTHER PUBLICATIONS

International Search Report, dated May 24, 2011, issued in corresponding PCT/JP2011/000753.
(Continued)

*Primary Examiner* — David Karst
(74) *Attorney, Agent, or Firm* — Millen, White, Zelano, Branigan, P.C.

(57) ABSTRACT

The present invention is a solventless one liquid type cyanate ester-epoxy composition comprising: (A) a multifunctional cyanate ester, or mixture thereof, of formula (1), wherein an average cyanate group number is 2.5 or more; (B) a multifunctional liquid epoxy resin, or mixture thereof, of formula (2), wherein an average epoxy group number is 2.5 or more, and (C) an amine latent curing agent.

$$[\text{Average cyanate group number}] = \frac{\sum_{i=1}^{n}(Ai \times Xi)}{100} \quad \text{Formula (1)}$$

Ai is a cyanate group number of component i, and Xi is a content ratio of component i (percent by mass) in the formula (1).

$$[\text{Average epoxy group number}] = \frac{\sum_{k=1}^{n}(Bk \times Yk)}{100} \quad \text{Formula (2)}$$

Bk is an epoxy group number of component k, and Yk is a content ratio of component k (percent by mass) in the formula (2).

24 Claims, 1 Drawing Sheet

Dynamic viscoelasticity

(51) Int. Cl.
*C09J 163/00* (2006.01)
*C08G 59/28* (2006.01)
*C08G 59/50* (2006.01)
*C08G 73/06* (2006.01)
*C08L 79/04* (2006.01)
*C09J 179/04* (2006.01)
*C08G 59/18* (2006.01)
*C08G 59/40* (2006.01)
*C08K 5/31* (2006.01)
*C08K 5/3492* (2006.01)

(52) U.S. Cl.
CPC ....... *C08G 59/4014* (2013.01); *C08G 59/5053* (2013.01); *C08G 73/0644* (2013.01); *C08G 73/0655* (2013.01); *C08L 63/00* (2013.01); *C08L 79/04* (2013.01); *C09J 179/04* (2013.01); *C08K 5/31* (2013.01); *C08K 5/34922* (2013.01)

(56) References Cited

U.S. PATENT DOCUMENTS

| | | | | |
|---|---|---|---|---|
| 6,124,023 | A * | 9/2000 | Furuta | C08J 5/24 428/172 |
| 7,923,516 | B2 | 4/2011 | Ogawa et al. | |
| 7,928,170 | B2 | 4/2011 | Ogawa et al. | |
| 2002/0197479 | A1 * | 12/2002 | Bae et al. | 428/413 |
| 2008/0009589 | A1 * | 1/2008 | Lutz | C08G 18/10 525/459 |
| 2010/0204410 | A1 | 8/2010 | Ogawa et al. | |
| 2010/0210793 | A1 | 8/2010 | Ogawa et al. | |
| 2011/0095453 | A1 | 4/2011 | Ogawa et al. | |
| 2011/0147954 | A1 * | 6/2011 | Kitamura | H01L 21/563 257/789 |
| 2012/0123082 | A1 | 5/2012 | Ogawa et al. | |
| 2012/0178853 | A1 | 7/2012 | Ogawa et al. | |

FOREIGN PATENT DOCUMENTS

| | | | | |
|---|---|---|---|---|
| JP | 9-100349 | A | 4/1997 | |
| JP | 9-279121 | A | 10/1997 | |
| JP | 9-291268 | A | 11/1997 | |
| JP | 2008-214567 | A | 9/2008 | |
| JP | 2009-013205 | A | 1/2009 | |
| JP | 2010-180352 | A | 8/2010 | |
| WO | 2009/001658 | A1 | 12/2008 | |
| WO | 2009/047885 | A1 | 4/2009 | |
| WO | 2009/157147 | A1 | 12/2009 | |
| WO | WO 2010029726 | A1 * | 3/2010 | ............ H01L 21/563 |
| WO | 2010/086932 | A1 | 8/2010 | |
| WO | 2011/036836 | A1 | 3/2011 | |

OTHER PUBLICATIONS

Safety Data Sheet; Adeka Resin, Product Name EP-4901E; prepared May 15, 2012 (revised Apr. 14, 2015), pp. 1-6.

* cited by examiner

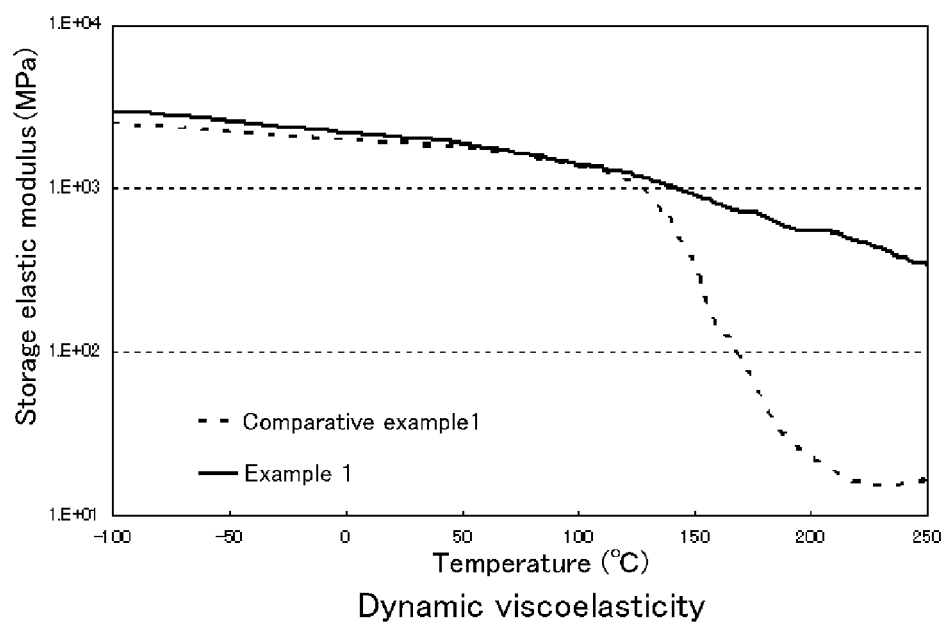
Dynamic viscoelasticity

SOLVENTLESS ONE LIQUID TYPE CYANATE ESTER-EPDXY COMPOSITE RESIN COMPOSITION

FIELD OF THE INVENTION

The present invention relates to a solventless cyanate ester-epoxy composite resin composition, particularly to solventless one liquid type cyanate ester-epoxy composite resin composition, comprised of multifunctional cyanate ester, multifunctional liquid epoxy resin and amine latent curing agent, having excellent electrical characteristics after curing such as low-dielectric constant and low-dielectric tangent (low tan δ) as well as excellent curing properties and thermal resistance.

BACKGROUND OF THE INVENTION

An epoxy resin composition has excellent electric performance and adhesive strength. Therefore, it has been used for various electric fields and electronic fields in the past. In addition, in cases where only insufficient effects can be obtained even when a conventional epoxy resin is used alone or in mixture, cyanate ester-epoxy composite resin composition comprised of mixing epoxy resin with cyanate ester is often used as a thermally-resistant resin composition for sealing of semiconductors or molding etc.

In recent years, as uses for electronic parts increase, durability and productivity are required under severe environmental conditions more than ever before to realize much higher thermal resistance and much more superior curing properties than before. Furthermore, as electronic circuits used in the periphery of semiconductor are highly integrated or speeded up, organic materials having low-dielectric tangent (low tan δ) as well as low-dielectric constant are required.

In order to meet these demands, liquid epoxy resin compositions used for sealing semiconductors comprised of, for example, cyanate ester, epoxy resin, inorganic filler and dihydrazide compound etc. (Patent document 1) and an invention using an amine curing agent for a composite composition which contains cyanate ester and epoxy resin (Patent document 2) were proposed, and also lots of cyanate ester-epoxy composite resin compositions such as a thermosetting resin composition using a latent curing agent which contains imidazole component together with cyanate ester and epoxy resin (Patent document 3) were proposed. However, these compositions have not only low productivity due to long curing time, but also insufficient thermal resistance and can not satisfy the requirements of low-dielectric constant and low-dielectric tangent (low tan δ). Therefore, further improvement is required.

PRIOR ART DOCUMENTS

Patent Documents

Patent document 1: Japanese Unexamined Patent Publication Tokkai 2001-302767
Patent document 2: Japanese Unexamined Patent Publication Tokkai-sho 60-250026
Patent document 3: Japanese Unexamined Patent Publication Toku hyo 2001-506313

SUMMARY OF THE INVENTION

Problems to be Solved by the Invention

Therefore, the object of the present invention is to provide a solventless one liquid type cyanate ester-epoxy composite resin composition, which is obtained by combining cyanate ester with epoxy resin, having low-dielectric constant and low-dielectric tangent (low tan δ) as well as excellent curing properties and thermal resistance.

Means to Solve the Problems

As a result of extensive studies, the inventors of the present invention found that the above object can be accomplished by the cyanate ester-epoxy composite resin composition comprised of multifunctional cyanate ester, multifunctional liquid epoxy resin and a latent curing agent selected from amines (Hereafter, this will be abbreviated to an amine latent curing agent), thereby achieving the present invention.

Namely, the present invention is a solventless one liquid type cyanate ester-epoxy composite resin composition comprised of (A) a multifunctional cyanate ester or mixture thereof represented by the following formula (1), wherein an average cyanate group number contained in the cyanate ester is 2.5 or more, (B) a multifunctional liquid epoxy or mixture thereof represented by the following formula (2), wherein an average epoxy group number contained in the cyanate ester is 2.5 or more, and (C) an amine latent curing agent.

$$[\text{Average cyanate group number}] = \frac{\sum_{i=1}^{n}(Ai \times Xi)}{100} \quad \text{Formula (1)}$$

wherein the Ai is a cyanate group number contained in the component i, and the Xi is a content ratio of the component i (percent by mass).

$$[\text{Average epoxy group number}] = \frac{\sum_{k=1}^{n}(Bk \times Yk)}{100} \quad \text{Formula (2)}$$

wherein the Bk is an epoxy group number contained in the component k, and the Yk is a content ratio of the component k (percent by mass).

Effect of the Invention

The cyanate ester-epoxy resin composition of the present invention, which has low-dielectric constant and low-dielectric tangent (low tan δ) as well as excellent curing properties and thermal resistance, is preferably used for sealing materials, adhesive agents, films, adhesive structures, semiconductor packages, resin-coated substances, electronic circuit substrates or the like.

BRIEF DESCRIPTION OF DRAWING

FIG. 1 shows the results of a measurement of dynamic viscosity and elasticity under the condition of rate of temperature rise of 2° C./min., scanning temperature range of −100 to 250° C., with respect to Example 1 and comparative example 1. In this regard, the solid line shows Example 1 and the dotted line shows Comparative example 1.

EMBODIMENTS FOR CARRYING OUT THE INVENTION

The multifunctional cyanate ester of the component (A) used for the present invention is not limited in particular. Examples include compounds represented by the following general formula (3).

General formula (3)

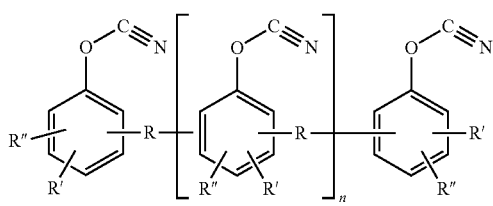

n is a number of 0.5 to 20, R is an unsubstituted or fluorine-substituted bivalent hydrocarbon group, R' and R" are a hydrogen atom or an alkyl group having 1 to 4 carbon atoms.

Furthermore, prepolymers of compounds represented by the following general formula (4), wherein a part of cyanate group forms a triazine ring, can also be used as the component (A).

 General formula (4):

$R^1$ in the above formula is an unsubstituted or fluorine-substituted bivalent hydrocarbon group, or represents —O—, —S—, or a single bond. $R^2$ and $R^3$ are each independently an unsubstituted phenylene group or a phenylene group substituted by 1 to 4 alkyl groups. Examples of the above prepolymer are trimers of all parts or a part of the compounds represented by the above general formula (4).

Among the following compounds represented by the above general formula (3),

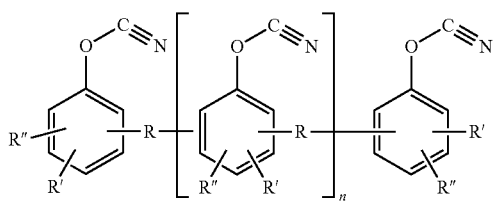

in particular, compounds wherein R is represented by an unsubstituted or fluorine-substituted methylene group or is represented by the following groups (herein n is an integer from 1 to 12), and a prepolymer of compounds represented by the above general formula (3), or a prepolymer of a compound represented by the following general formula (5) which belongs to the above general formula (4) are more preferable.

General formula (5)

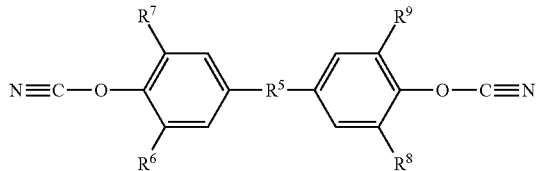

$R^5$ in the above formula is

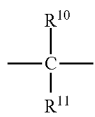

a group:

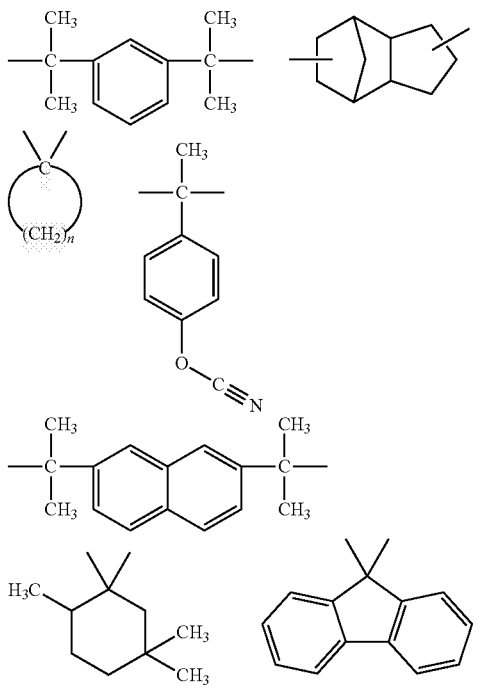

herein, $R^{10}$ and $R^{11}$ are each independently a hydrogen atom or an unsubstituted or fluorine-substituted methyl group), or groups:

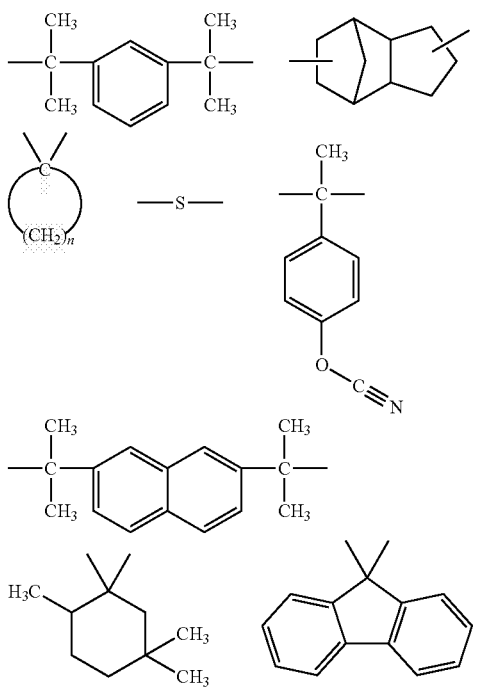

n in the above formula is an integer from 4 to 12, $R^6$, $R^7$, $R^8$ and $R^9$ are each independently a hydrogen atom or an unsubstituted or fluorine-substituted methyl group.

Preferable multifunctional cyanate ester compounds used as the component (A) in the present invention are specifically a phenol novolac polycyanate compound and a cresol novolac polycyanate compound. In particular, prepolymers of phenol novolac polycyanate, cresol novolac polycyanate, 4,4'-ethylidene bisphenylene cyanate, 2,2-bis(4-cyanatophenyl) propane and bis(4-cyanato-3,5-dimethylphenyl)ethane are preferable.

These multifunctional cyanate esters can be used alone or can be used with two or more kinds of cyanate esters in combination. However, it is required that an average cyanate group number represented by the following formula (1) is 2.5 or more when used.

$$[\text{Average cyanate group number}] = \frac{\sum_{i=1}^{n}(Ai \times Xi)}{100} \quad \text{Formula (1)}$$

Ai in the above formula is a cyanate group number contained in the component i, and the Xi is a content ratio (percent by mass) of the component i.

Examples of multifunctional liquid epoxy resin of the component (B) used in the present invention, and the epoxy resin which can form the mixture thereof are polyglycidyl ether compounds of mononuclear polyphenol compounds such as hydroquinone, resorcin, pyrocatechol and phloroglucinol; polyglycidyl ether compounds of polynuclear polyphenol compounds such as dihydroxy naphthalene, biphenol, methylene bisphenol (bisphenol F), methylene bis(o-cresol), ethylidene bisphenol, isopropylidene bisphenol (bisphenol A), isopropylidene bis(o-cresol), tetrabromo bisphenol A, 1,3-bis (4-hydroxycumylbenzene), 1,4-bis(4-hydroxycumylbenzene), 1,1,3-tris(4-hydroxyphenyl)buthane, 1,1,2,2-tetra(4-hydroxyphenyl)ethane, thiobisphenol, sulfonylphenol, oxybisphenol, phenolnovolac, o-cresolnovolac, ethylphenolnovolac, butylphenolnovolac, octylphenolnovolac, resorcinnovolac and terpene phenol; polyglycidyl ether compounds of polyhydric alcohols such as ethylene glycol, propylene glycol, butylene glycol, hexanediol, polyglycol, thiodiglycol, glycerin, trimethylol propane, pentaerythritol, sorbitol and bisphenol A-ethylene oxide addition products; glycidyl esters of aliphatic, aromatic or alicyclic polybasic acid such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesic acid, pyromellitic acid, tetrahydrophthalic acid, hexahydrophthalic acid and endomethylenetetrahydrophthalic acid, and homopolymer or copolymer of glycidyl methacrylate; epoxy compounds having glycidylamino groups such as N,N-diglycidyl aniline, bis(4-(N-methyl-N-glycidylamino)phenyl)methane, diglycidyl-o-toluidine, N,N-bis(2,3-epoxypropyl)-4-(2,3-epoxypropoxy)-2-methylaniline, N,N-bis(2,3-epoxypropyl)-4-(2,3-epoxypropoxy)aniline and N,N,N',N'-tetra(2,3-epoxypropyl)-4,4'-diaminodiphenylmethane; epoxidized compounds of cyclic olefin compounds such as vinylcyclohexene diepoxide, dicyclopentadiene diepoxide, 3,4-epoxy cyclohexylmethyl-3,4-epoxycyclohexane carboxylate, 3,4-epoxy-6-methylcyclohexylmethyl-6-methylcyclohexane carboxylate and bis(3,4-epoxy-6-methylcyclohexylmethyl) adipate; epoxidized conjugated diene polymers such as epoxidized polybutadiene and epoxidized styrene-butadiene copolymer; a heterocyclic compound such as triglycidylisocyanurate. These epoxy resins may be internally cross-linked by prepolymers having isocyanate groups at the ends thereof or may be highly-molecularized by compounds having polyhydric active hydrogen (polyhydric phenol, polyamine, carbonyl group-containing compound and polyphosphate ester etc.).

When these epoxy resins are used in the present invention, it is required that an average epoxy group number represented by the following formula (2) is 2.5 or more.

$$[\text{Average epoxy group number}] = \frac{\sum_{k=1}^{n}(Bk \times Yk)}{100} \quad \text{Formula (2)}$$

Bk in the above formula is an epoxy group number contained in the component k, and the Yk is a content ratio (percent by mass) of the component k.

It is preferable in the present invention that, among these, 50 to 100 percent by mass of at least one compound selected from epoxy compounds having glycidylamino groups such as N,N-bis(2,3-epoxypropyl)-4-(2,3-epoxypropoxy)-2-methylaniline, N,N-bis(2,3-epoxypropyl)-4-(2,3-epoxypropoxy) aniline and N,N,N',N'-tetra(2,3-epoxypropyl)-4,4'-diaminodiphenylmethane, which are low-viscosity compounds excellent in balance between reactivity and thermal resistance, is contained.

It is preferable that an amine latent curing agent of the component (C) used for the present invention is an active hydrogen-containing amine latent curing agent since it has superior reactivity. In particular, it is preferable that this amine latent curing agent is a latent curing agent comprised of (a) modified amine which is obtained by reacting (a-1) polyamine compound with (a-2) epoxy compound and has one or more of amino group having active hydrogen within a molecule, and (b) phenol resin.

Examples of polyamine compound of the above component (a-1) used for the present invention are aliphatic polyamines such as ethylenediamine, diethylenetriamine, triethylenetetramine, tetraethylenepentamine, polyoxypropylenediamine and polyoxypropylenetriamine; alicyclic polyamines such as isophorone diamine, menthen diamine, bis(4-amino-3-methyldicyclohexyl)methane, diaminodicyclohexylmethane, bis(aminomethyl)cyclohexane, N-aminoethylpiperazine and 3,9-bis(3-aminopropyl)-2,4,8,10-tetraoxaspiro(5,5)undecane; mononuclear polyamines such as m-phenylenediamine, p-phenylenediamine, 2,4-tolylenediamine, 2,6-tolylenediamine, mesitylene-2,4-diamine, mesitylene-2,6-diamine, 3,5-diethyl-l-2,4-tolylenediamine and 3,5-diethyl-2,6-tolylenediamine; aromatic polyamines such as biphenylenediamine, 4,4-diaminodiphenylmethane, 2,5-naphthylenediamine and 2,6-naphthylenediamine; an imidazole such as 2-aminopropyl imidazole etc.

Among the above polyamine compounds, in the present invention in particular, it is preferable to use (1) diamine having two primary or secondary amino groups which have different reactivities respectively within a molecule and/or (2) at least one polyamine compound selected from aromatic polyamine, alicyclic polyamine and aliphatic polyamine wherein two or more primary or secondary amino groups are within a molecule and when one of them reacts with an epoxy group, steric hindrance thereby deteriorates reactivity of the remaining primary or secondary amino group with an epoxy group, from the viewpoints where not only adhesive properties but also physical properties in cured material of cyanate ester-epoxy resin composition in the present invention can be improved.

Examples of diamine corresponding to the above (1) are isophorone diamine, menthane diamine, 2,2,4-trimethylhexamethylenediamine, 2,4,4-trimethylhexamethylenediamine and 1,2-diaminopropane or the like. Examples of diamine corresponding to the above (2) are m-xylylenediamine and 1,3-bisaminocyclohexane or the like. However, the present invention is not limited to these.

Examples of epoxy compounds of the component (a-2) used for the present invention are monoglycidylether compounds such as phenyl glycidylether, allyl glycidylether, methyl glycidylether, butyl glycidylether, secondary butyl glycidylether, 2-ethylhexyl glycidylether, 2-methyloctyl glycidylether and stearyl glycidylether; a monoglycidylester compound such as versatic acid glycidylester; polyglycidyl ether compounds of mononuclear multivalent phenol compounds such as hydroquinone, resorcin, pyrocatechol and phloroglucinol; polyglycidyl ether compounds of multinuclear multivalent phenol compounds such as dihydroxy naphthalene, bisphenol, methylenebisphenol (bisphenol F), methylene bis(o-cresol), ethylidene bisphenol, isopropylidene bisphenol (bisphenol A), isopropylidene bis(o-cresol), tetrabromobisphenol A, 1,3-bis(4-hydroxycumylbenzene), 1,4-bis(4-hydroxycumylbenzene), 1,1,3-tris(4-hydroxyphenyl)butane, 1,1,2,2-tetra(4-hydroxyphenyl)ethane, thiobisphenol, sulfonylbisphenol, oxybisphenol, phenol novolac, o-cresol novolac, ethylphenol novolac, butylphenol novolac, octylphenol novolac, resorcin novolac and terpenephenol; polyglycidyl ether compounds of polyalcohols such as ethyleneglycol, propylene glycol, butylene glycol, hexanediol, polyglycol, thiodiglycol, glycerin, trimethylol propane, pentaerythritol, sorbitol and bisphenol A-ethylene oxide addition products; glycidyl esters of aliphatic, aromatic or alicyclic polybasic acid such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesic acid, pyromellitic acid, tetrahydrophthalic acid, hexahydrophthalic acid, endomethylene tetrahydrophthalic acid, and homopolymers or copolymers of glycidyl methacrylate; epoxy compounds having glycidylamino groups such as N,N-diglycidyl aniline, bis(4-(N-methyl-N-glycidylamino)phenyl)methane and diglycidyl-o-toluidine; epoxidized compounds of cyclic olefin compounds such as vinylcyclohexene diepoxide, dicyclopentadiene diepoxide, 3,4-epoxy cyclohexylmethyl-3,4-epoxycyclohexane carboxylate, 3,4-epoxy-6-methylcyclohexylmethyl-6-methylcyclohexane carboxylate and bis(3,4-epoxy-6-methylcyclohexylmethyl)adipate; epoxidized conjugated diene polymers such as epoxidized polybutadiene and epoxidized styrene-butadiene copolymer; and a heterocyclic compound such as triglycidylisocyanurate.

It is preferable in the present invention to use polyglycidyl ether compounds having two or more epoxy groups within a molecule among these. In particular, it is preferable to use polyglycidyl ether of bisphenol compounds such as methylenebisphenol (bisphenol F), methylene bis(o-cresol), ethylidene bisphenol, isopropylidene bisphenol (bisphenol A) and isopropylidene bis(o-cresol).

Herein, when polyamine, having two or more of amino groups consisting of primary amino group and secondary amino group, is used as the component (a-1), it is preferable to use, as the component (a), the modified-polyamine obtained by the reaction between the component (a-2) of the amount corresponding to 0.5 to 2, especially 0.8 to 1.5 epoxy equivalent and 1 mol of the component (a-1). In addition, in the present invention, it is available to combine, as the component (a-1), different modified-amine compounds and/or imidazole compounds, such as combining modified-amine obtained by using polyamine corresponding to the aforementioned (1) with modified-amine obtained by using imidazole compound.

A phenol resin of the component (b) used for the present invention is a phenol resin synthesized from phenols and aldehydes. Examples of the above phenols are phenol, cresol, ethylphenol, n-propylphenol, isopropylphenol, butylphenol, tert-butylphenol, octylphenol, nonylphenol, dodecylphenol, cyclohexylphenol, chlorophenol, bromophenol, resorcin, catechol, hydroquinone, 2,2-bis(4-hydroxyphenyl) propane, 4,4'-thiodiphenol, dihydroxydiphenylmethane, naphthol, terpenephenol and phenolized dicyclopentadiene etc. The example of the above aldehydes is formaldehyde.

In addition, by using the phenol resin of the component (b) having 750 to 1,200 of number average molecular weight, the cyanate ester-epoxy resin composition having excellent balance between storage stability and curing properties can be obtained in the present invention.

It is preferable that the amount of the component (b) used is 10 to 100 mass parts relative to 100 mass parts of the component (a), in particular 20 to 60 mass parts is more preferable. When it is less than 10 mass parts, sufficient curing properties may not be obtained and when it is more than 100 mass parts, the physical properties of the cured material deteriorate, which is not preferable.

It is preferable that an amine latent curing agent of the component (C) used for the present invention is a guanidine compound, from the viewpoint that the cyanate ester-epoxy resin composition of the present invention having excellent stability can be obtained even though the blending amount thereof is small. Examples of these guanidine compounds are compounds represented by the following general formulae.

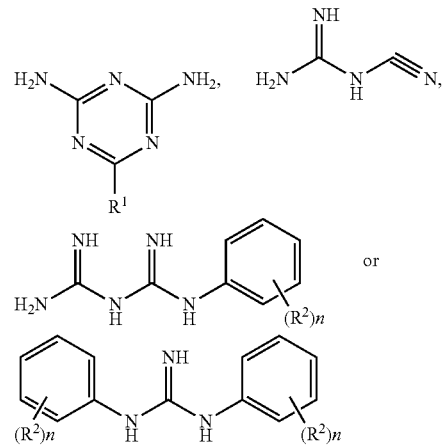

n represents an integer from 0 to 5, $R^1$ represents an amino group, or an unsubstituted or fluorine-substituted monovalent hydrocarbon group, and $R^2$ represents a hydrogen atom or an alkyl group having 1 to 4 carbon atoms in the above formulae.

In the present invention, among these guanidine compounds, acetoguanamine, benzoguanamine or dicyandiamide is preferable from the viewpoint that the balance between stability and reactivity is excellent.

The amount of the components (A) and (B) used in the cyanate ester-epoxy resin composition of the present invention is usually 1 to 10,000, preferably 10 to 1,000, more preferably 20 to 500 mass parts of the component (B), relative to the 100 mass parts of the component (A).

It is preferable that the amount of the component (C) used in the cyanate ester-epoxy resin composition of the present invention is 3 to 60 mass parts relative to 100 mass parts of the total amount of the components (A) and (B), in particular 5 to 50 mass parts is preferable. In addition, it is preferable that the total amount of the components (A), (B) and (C) is 30 percent by mass or more in the cyanate ester-epoxy resin composition of the present invention.

The cyanate ester-epoxy resin composition of the present invention may contain commonly used additives such as fillers or pigments such as glass fiber, carbon fiber, cellulose, siliceous sand, cement, kaolin, clay, aluminum hydroxide, bentonite, talk, silica, fine powder silica, titanium dioxide, carbon black, graphite, iron oxide, bituminous substance, metallic particle and resin particle coated with metal; thickners; thixotropic agents; flame retardants; defoamers; fungus resistance agents; colloidal silica and colloidal alumina, if necessary, and moreover can contain sticky resins such as xylene resin and petroleum resin.

By using the cyanate ester-epoxy resin composition of the present invention as solventless one liquid type, the generation of VOC (volatile organic compound) can be inhibited. In addition, environmentally-friendly, safe and secure materials can be provided, and also applications in the fields where solvents can not be used, such as permeation followed by curing at the site of narrow gap, become possible.

Solventless one liquid type cyanate ester-epoxy resin composition of the present invention can be widely used for a coating composition against concrete, cement, mortar, various types of metal, leather, glass, rubber, plastic, wood, cloth and paper etc., or for an adhesive agent. In particular, since one liquid type cyanate ester-epoxy resin composition of the present invention has high thermal resistance and excellent adhesive properties, it is suitably used for electronic materials or automobile materials such as sealing materials to protect semiconductors, and for adhesive materials to bond electronic parts etc.

One liquid type cyanate ester-epoxy resin composition of the present invention will now be described in more detail referring to manufacturing examples and examples, but the present invention should not be limited by these descriptions.

Manufacturing Example 1

Synthesis of Amine Latent Curing Agent 352 g of isophoronediamine was reacted with 580 g of the ADEKA RESIN EP-4100E (Commercial name of the product manufactured by ADEKA CORPORATION; it is a bisphenol A type epoxy resin, and its epoxy equivalent is 190) (the epoxy equivalent of the ADEKA RESIN EP-4100E is 1.47 relative to I mol of isophoronediamine) to obtain modified-polyamine. 30 g of phenol resin was introduced into 100 g of the modified-polyamine obtained, then the solvent was removed for one hour under the condition of 180 to 190° C. and 30 to 40 torr to obtain the latent curing agent (EH-1).

Examples 1, 2 and Comparative Example 1-3

According to the composition shown in the following [Table 1], mixtures were prepared. Each mixture was stirred and dispersed to obtain a resin composition. The following tests were carried out against the obtained resin compositions. The results were also shown in [Table 1]. Each measurement was carried out as described below.

<Viscosity>

Viscosity under the condition of 5 rpm at 25° C. was measured by using Brookfield E type rotation viscometer.

<Gel Time>

0.5 g of each composition obtained was dropped on a hot plate, wherein each temperature during measurement was maintained, and the time until the fluidity of the composition disappeared was measured, wherein a mixing was carried out with spatulas or the like.

<DSC>

By using the differential scanning calorimeter DSC 6220 manufactured by SII Nano Technology Inc., the DSC chart was obtained under the condition of 10° C./minute of temperature rising speed from 25 to 250° C. of scanning temperature range. Furthermore, the secondary temperature rising was carried out under the same condition to measure the glass transition point from the inflection point of heat capacity curve obtained.

<Linear Expansion Coefficient>

A cylindrical cured material with a 4 mm diameter was manufactured and the DSC chart was obtained under the condition of 2° C./minute of temperature rising speed from 20 to 250° C. of scanning temperature range, by using the differential scanning calorimeter TMA 6220 manufactured by SII Nano Technology Inc., to show the linear expansion coefficients of low temperature side (30 to 80° C.) and high temperature side (170 to 220° C.).

<High Frequency Characteristics>

A cured plate of 1 mm thick was manufactured and dielectric constant ∈ and dielectric tangent δ per frequency were measured, by using the RF impedance/material•analyzer E 4991 A manufactured by Agilent•Technologies.

<Dynamic Viscoelasticity>

Regarding Example 1 and Comparative example 1 only, plate-like cured materials of 5 mm×20 mm×0.2 mm were manufactured and dynamic viscolasticity was measured under the condition of 2° C./minute of temperature rising speed from −100 to 250° C. of scanning temperature range, by using RHEOVIBRON DDV-01FP of the dynamic viscoelasticity automatic measuring instrument manufactured by A & D Company limited. The results were shown in [FIG. 1].

TABLE 1

|  |  | Example 1 | Example 2 | Comp. Example 1 | Comp. Example 2 | Comp. Example 3 |
| --- | --- | --- | --- | --- | --- | --- |
| Composition | EP-1 |  |  | 36 | 36 | 93 |
|  | EP-2 | 36 | 47 |  |  |  |
|  | EP average functional group number | 3 | 3 | 2 | 2 | 2 |
|  | CE-1 | 22 | 29 | 36 | 22 |  |
|  | CE-2 | 14 | 19 |  | 14 |  |
|  | CE average functional group number | 4.1 | 4.1 | 2 | 4.1 |  |
|  | EH-1 | 28 |  | 28 | 28 |  |
|  | DICY |  | 5 |  |  | 7 |
|  | SiO$_2$ | 555 | 555 | 555 | 555 | 555 |

TABLE 1-continued

|  |  | Example 1 | Example 2 | Comp. Example 1 | Comp. Example 2 | Comp. Example 3 |
|---|---|---|---|---|---|---|
| Viscosity | Pa · s/1 rpm, 25° C. | 155 | 81 | 57 | 303 | 347 |
| Gel time | 120° C. | 3 min 15 sec | 7 min 41 sec | 2 min 58 sec | 3 min 46 sec | 30 min< |
|  | 150° C. | 43 sec | 1 min 36 sec | 35 sec | 1 min 8 sec | 30 min< |
| DSC | Exothermic onset temperature(° C.) | 94.4 | 157.7 | 84.3 | 129.6 | 155.7 |
|  | Exothermic peak 1 temperature (° C.) | 96.9 | 179.4 | 90.4 | 171.4 | 165.4 |
|  | Exothermic and temperature (° C.) | 232.0 | 203.0 | 97.8 | 227.1 | 289.3 |
|  | Tg (° C.) | ※ | ※ | 121.3 | 134.7 | 122.2 |
| Linear expansion coefficient | Low temperature side (ppm/30-80° C.) | 10.2 | 9.65 | 11.0 | 10.3 | 10.5 |
|  | High temperature side (ppm/170-220° C.) | 20.9 | 16.9 | 48.9 | 47.7 | 51.0 |
| High frequency characteristics | ε/tanδ 10 MHz | 2.7/0.004 | 2.7/0.003 | 2.7/0.004 | 2.7/0.003 | 3.2/0.012 |
|  | ε/tanδ 100 MHz | 2.7/0.005 | 2.7/0.006 | 2.8/0.006 | 2.7/0.005 | 3.3/0.014 |
|  | ε/tanδ 1 GHz | 2.8/0.006 | 2.7/0.005 | 2.8/0.007 | 2.7/0.005 | 3.3/0.016 |

※: No definite inflection points
Each component used in the Table 1 is as follows.
CE-1: 2 functional cyanate ester (PrimasetLeCy: Commercial name of bisphenol E type cyanate ester manufactured by Lonza Co.),
CE-2: Multifunctional cyanate ester (PrimasetPT-30: Commercial name of phenol novolac type cyanate ester manufactured by Lonza Co., and its average functional group number is 7.3),
EP-1: 2 functional epoxy resin (EP-4100L: Commercial name of bisphenol F type epoxy resin manufactured by ADEKA CORPORATION and its epoxy equivalent is 170),
EP-2: 3 functional epoxy resin (EP-3950S: Commercial name of aminophenol type epoxy resin manufactured by ADEKA CORPORATION and its epoxy equivalent is 95),
DICY: Dicyandiamide (EH-3636AS: Commercial name of the product manufactured by ADEKA CORPORATION),
SiO₂: Silica filler (FB-950: Commercial name of the product manufactured by DENKI KAGAKU KOGYO KABUSHIKI KAISHA).

As is clear from the Table 1, the solventless one liquid type cyanate ester-epoxy composite resin composition of the present invention comprised of multifunctional cyanate ester, multifunctional liquid epoxy resin and amine latent curing agent (Examples 1 and 2) has more excellent curing properties than Comparative example 3 using epoxy resin alone and also can obtain superior high frequency characteristics due to low dielectric constant and low dielectric tangent. In addition, the solventless one liquid type cyanate ester-epoxy composite resin composition of the present invention (Examples 1 and 2) has lower linear expansion coefficient in the high temperature side and higher thermal resistance than Comparative example 1 using two functional cyanate ester and two functional epoxy resin and Comparative example 2 using two functional cyanate ester and multifunctional epoxy resin. Furthermore, it is clear that the above thermal resistance is improved from the fact that the decline of coefficient of elasticity is low in the viscoelastic data.

INDUSTRIAL APPLICABILITY

By using the cyanate ester-epoxy resin composition of the present invention as solventless one liquid type, environmentally-friendly, safe and secure materials can be provided as well as the generation of VOC (volatile organic compound) can be inhibited, and also the applications of the solventless one liquid type cyanate ester-epoxy resin composition of the present invention are possible for the fields where solvents can not be used, such as permeation followed by curing at the site of narrow gap, which is remarkably useful industrially.

What is claimed is:
1. A solventless one liquid type cyanate ester-epoxy composite resin composition; comprising:
(A) a multifunctional cyanate ester resin or mixture thereof represented by the following formula (1), wherein the average cyanate group number of all the components (A) is 2.5 or more, (B) multifunctional liquid epoxy resin or mixture thereof represented by the following formula (2), wherein the average epoxy group number of all the components (B) is 2.5 or more, and (C) amine latent curing agent,

$$[\text{Average cyanate group number}] = \frac{\sum_{i=1}^{n}(Ai \times Xi)}{100} \quad \text{Formula (1)}$$

wherein Ai is the cyanate group number of component i, Xi is the content ratio of component i in terms of percent by mass, and n is the total number of components (A), Formula (2):

$$[\text{Average epoxy group number}] = \frac{\sum_{k=1}^{n}(Bk \times Yk)}{100} \quad \text{Formula (2)}$$

wherein Bk is the epoxy group number of component k, Yk is the content ratio of component k in terms of percent by mass, and n is the total number of components (B),
wherein the multifunctional liquid epoxy resin of the above component (B) contains 50 to 100 percent by mass of N,N-bis(2,3-epoxypropyl)-4-(2,3-epoxypropoxy)-2-methylaniline, and
wherein the amine latent curing agent component (C) is an active hydrogen-containing amine latent curing agent, and the amine latent curing agent component (C) is a latent curing agent comprised of (a) a modified amine, which is obtained by reacting (a-1) a polyamine compound with (a-2) an epoxy compound, and has one or more of amino groups having active hydrogen within a molecule, and (b) phenol resin.
2. The solventless one liquid type cyanate ester-epoxy composite resin composition according to claim 1, wherein polyamine compound (a-1) is at least one compound selected from (1) a diamine having two primary or secondary amino groups which have different reactivity respectively in a molecule, (2) an aromatic polyamine wherein two or more primary or secondary amino groups exist in a molecule and when one of them reacts with an epoxy group, steric hindrance thereby deteriorates the reactivity of the remaining primary or secondary amino group with an epoxy group, (3) alicyclic polyamine and (4) aliphatic polyamine.

3. The solventless one liquid type cyanate ester-epoxy composite resin composition according to claim 1, wherein the epoxy compound (a-2) is a polyglycidyl ether compound having two or more epoxy groups in a molecule.

4. The solventless one liquid type cyanate ester-epoxy composite resin composition according to claim 1, wherein the modified polyamine component (a) is a modified-polyamine obtained by reacting 0.5 to 2 equivalent of the component (a-2) with 1 mol of the component (a-1).

5. The solventless one liquid type cyanate ester-epoxy composite resin composition according to claim 1, wherein the phenol resin component (b) has 750 to 1,200 of number average molecular weight.

6. The solventless one liquid type cyanate ester-epoxy composite resin composition according to claim 1, wherein 10 to 100 mass parts of phenol resin component (b) is used relative to 100 mass parts of modified-polyamine component (a).

7. The solventless one liquid type cyanate ester-epoxy composite resin composition according to claim 1, wherein the multifunctional cyanate ester component (A) is at least one compound and/or prepolymer selected from compounds represented by formula (3) and prepolymers of compounds represented by formula (4);

formula (3)

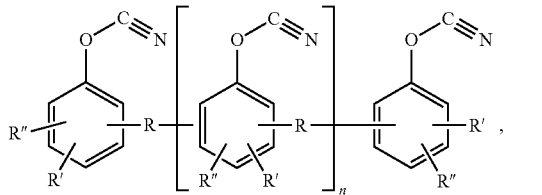

wherein
n is a number of 0.5 to 20,
R is an unsubstituted or fluorine-substituted bivalent hydrocarbon group, and
R' and R" are a hydrogen atom or an alkyl group having 1 to 4 carbon atoms; formula (4):

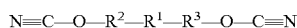

wherein
$R^1$ in the above formula is an unsubstituted or fluorine-substituted bivalent hydrocarbon group, or represents —O—, —S—, or a single bond, and
$R^2$ and $R^3$ are each independently an unsubstituted phenylene group or a phenylene group substituted by 1 to 4 alkyl groups.

8. A curing material comprising cured material obtained by polymerization-curing the resin composition according to claim 1.

9. A method for manufacturing a curing material comprised of curing the resin composition according to claim 1 in a mold.

10. The solventless one liquid type cyanate ester-epoxy composite resin composition according to claim 1, wherein the amount of the components (A) and (B) used in the cyanate ester-epoxy resin composition is 10 to 1,000 mass parts of the component (B), relative to the 100 mass parts of the component (A).

11. The solventless one liquid type cyanate ester-epoxy composite resin composition according to claim 1, wherein the amount of the components (A) and (B) used in the cyanate ester-epoxy resin composition is 20 to 500 mass parts of the component (B), relative to the 100 mass parts of the component (A).

12. The solventless one liquid type cyanate ester-epoxy composite resin composition according to claim 1, wherein the amount of the component (C) used in the cyanate ester-epoxy resin composition is 3 to 60 mass parts relative to 100 mass parts of the total amount of the components (A) and (B).

13. The solventless one liquid type cyanate ester-epoxy composite resin composition according to claim 1, wherein the amount of the component (C) used in the cyanate ester-epoxy resin composition is 5 to 50 mass parts relative to 100 mass parts of the total amount of the components (A) and (B).

14. The solventless one liquid type cyanate ester-epoxy composite resin composition according to claim 1, wherein the total amount of the components (A), (B) and (C) is 30 percent by mass or more of the total mass of the cyanate ester-epoxy resin composition.

15. The solventless one liquid type cyanate ester-epoxy composite resin composition according to claim 1, wherein the average epoxy group number of all the components (B) is 3 or more.

16. A solventless one liquid type cyanate ester-epoxy composite resin composition; comprising:
(A) a multifunctional cyanate ester resin or mixture thereof represented by the following formula (1), wherein the average cyanate group number of all the components (A) is 2.5 or more, (B) multifunctional liquid epoxy resin or mixture thereof represented by the following formula (2), wherein the average epoxy group number of all the components (B) is 2.5 or more, and (C) amine latent curing agent, $$[\text{Average cyanate group number}] = \frac{\sum_{i=1}^{n}(Ai \times Xi)}{100} \quad \text{Formula (1)}$$

wherein Ai is the cyanate group number of component i, Xi is the content ratio of component i in terms of percent by mass, and n is the total number of components (A), $$[\text{Average epoxy group number}] = \frac{\sum_{k=1}^{n}(Bk \times Yk)}{100} \quad \text{Formula (2)}$$

wherein Bk is the epoxy group number of component k, Yk is the content ratio of component k in terms of percent by mass, and n is the total number of components (B),
wherein the multifunctional liquid epoxy resin of the above component (B) contains 50 to 100 percent by mass of N,N-bis(2,3-epoxypropyl)-4-(2,3-epoxypropoxy)-2-methylaniline, and
wherein the amine latent curing agent component (C) is an active hydrogen-containing amine latent curing agent, and the amine latent curing agent component (C) is a latent curing agent comprised of (a) a modified amine, which is obtained by reacting (a-1) a polyamine compound with (a-2) an epoxy compound, and has one or more of amino groups having active hydrogen within a molecule, and (b) phenol resin, and wherein a cured resin composition obtained by curing said solventless one liquid type cyanate ester-epoxy composite resin composition does not have a glass transition temperature at 25 to 250° C. when measured by using the differential scanning calorimeter DSC 6220 manufactured by SII Nano Technology Inc.

17. A solventless one liquid type cyanate ester-epoxy composite resin composition; comprising:
(A) a multifunctional cyanate ester resin or mixture thereof represented by the following formula (1), wherein the average cyanate group number of all the components (A) is 2.5 or more, (B) multifunctional liquid epoxy resin or mixture thereof represented by the following formula (2), wherein the average epoxy group number of all the components (B) is 2.5 or more, and (C) amine latent curing agent, $$[\text{Average cyanate group number}] = \frac{\sum_{i=1}^{n}(Ai \times Xi)}{100} \quad \text{Formula (1)}$$

wherein Ai is the cyanate group number of component i, Xi is the content ratio of component i in terms of percent by mass, and n is the total number of components (A), $$[\text{Average epoxy group number}] = \frac{\sum_{k=1}^{n}(Bk \times Yk)}{100} \quad \text{Formula (2)}$$

wherein Bk is the epoxy group number of component k, Yk is the content ratio of component k in terms of percent by mass, and n is the total number of components (B), wherein the multifunctional liquid epoxy resin of the above component (B) contains 50 to 100 percent by mass of m N,N-bis(2,3-epoxypropyl)-4-(2,3-epoxypropoxy)-2-methylaniline, wherein the amine latent curing agent component (C) is a latent curing agent selected from: (I) latent curing agents comprised of (a) a modified amine obtained by reacting (a-1) a polyamine compound with (a-2) an epoxy compound, and has one or more of amino groups having active hydrogen within a molecule, and (b) phenol resin; and (II) guanidine compounds selected from the following compounds:

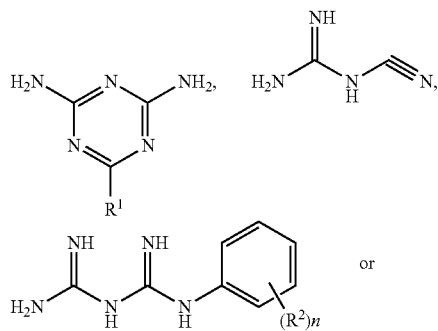

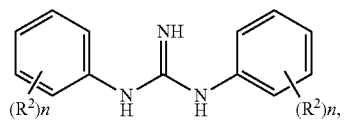

wherein n represents an integer from 0 to 5,

R$^1$ represents an amino group, or an unsubstituted or fluorine-substituted monovalent hydrocarbon group having 1 to 15 carbon atoms, and R$^2$ represents a hydrogen atom or an alkyl group having 1 to 4 carbon atoms in the above formulae.

18. The solventless one liquid type cyanate ester-epoxy composite resin composition according to claim 17, wherein said amine latent curing agent component (C) is a guanidine compound selected from the following compounds:

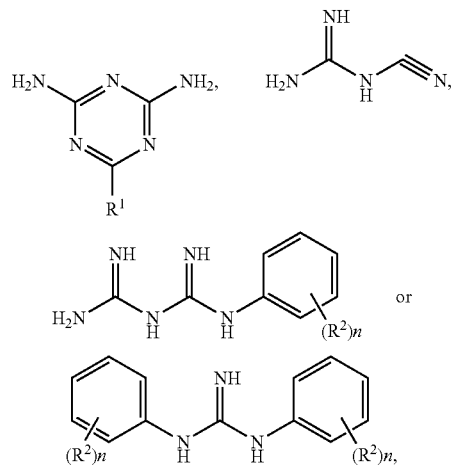

wherein n represents an integer from 0 to 5,

R$^1$ represents an amino group, or an unsubstituted or fluorine-substituted monovalent hydrocarbon group having 1 to 15 carbon atoms, and R$^2$ represents a hydrogen atom or an alkyl group having 1 to 4 carbon atoms in the above formulae.

19. The solventless one liquid type cyanate ester-epoxy composite resin composition according to claim 18, wherein said guanidine compound is selected from acetoguanamine, benzoguanamine and dicyandiamide.

20. The solventless one liquid type cyanate ester-epoxy composite resin composition according to claim 18, wherein said guanidine compound is acetoguanamine.

21. The solventless one liquid type cyanate ester-epoxy composite resin composition according to claim 18, wherein guanidine compound is benzoguanamine.

22. The solventless one liquid type cyanate ester-epoxy composite resin composition according to claim 17, wherein the amine latent curing agent component (C) is at least one guanidine compound selected from the following guanidine compounds:

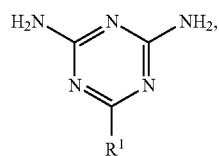

wherein R¹ represents an amino group, or an unsubstituted or fluorine-substituted monovalent hydrocarbon group having 1 to 15 carbon atoms.

23. The solventless one liquid type cyanate ester-epoxy composite resin composition according to claim 17, wherein the amine latent curing agent component (C) is at least one guanidine compound selected from the following guanidine compounds:

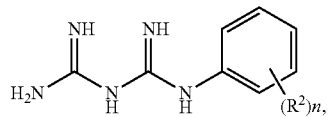

wherein
n represents an integer from 0 to 5, and
R² represents a hydrogen atom or an alkyl group having 1 to 4 carbon atoms in the above formulae.

24. The solventless one liquid type cyanate ester-epoxy composite resin composition according to claim 17, wherein the amine latent curing agent component (C) is at least one guanidine compound selected from the following guanidine compounds:

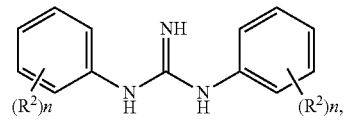

wherein
n represents an integer from 0 to 5, and
R² represents a hydrogen atom or an alkyl group having 1 to 4 carbon atoms in the above formulae.

\* \* \* \* \*